US006327960B1

(12) United States Patent
(10) Patent No.: US 6,327,960 B1
(45) Date of Patent: Dec. 11, 2001

Heimueller et al.

(54) DIAPHRAGM PUMP WITH A HYDRAULICALLY DRIVEN DIAPHRAGM

(75) Inventors: Ralph Heimueller, Erlangen; Eberhard Schluecker, Obersulm, both of (DE)

(73) Assignee: LEWA Herbert Ott GmbH & Co., Leonberg (DE)

( * ) Notice: Subject to any disclaimer, the term of this patent is extended or adjusted under 35 U.S.C. 154(b) by 0 days.

(21) Appl. No.: 09/487,246

(22) Filed: Jan. 19, 2000

(30) Foreign Application Priority Data

Jan. 19, 1999 (DE) ............................................ 199 01 893

(51) Int. Cl.[7] ........................................................ F16J 3/02
(52) U.S. Cl. ............................................................ 92/98 R
(58) Field of Search .............................. 92/96, 98 R, 104

(56) References Cited

U.S. PATENT DOCUMENTS

| | | | | |
|---|---|---|---|---|
| 1,572,970 | * | 2/1926 | Stalker | 92/98 R |
| 1,927,617 | | 9/1933 | Schmidt | 92/104 X |
| 2,150,771 | * | 3/1939 | Kollsman | 92/104 X |
| 2,698,766 | * | 1/1955 | Cox | 92/104 X |
| 2,760,260 | * | 8/1956 | Melchior | 92/104 X |
| 4,375,182 | * | 3/1983 | Zavoda | 92/98 R |
| 6,145,430 | * | 11/2000 | Able et al. | 92/96 X |

FOREIGN PATENT DOCUMENTS

| | | | | |
|---|---|---|---|---|
| 196 31 081 | | 10/1997 | (DE) . | |
| 787.226 | | 9/1935 | (FR) . | |
| 521273 | * | 5/1940 | (GB) | 92/104 |
| 540036 | | 10/1941 | (GB) . | |
| 32963 | * | 6/1934 | (NL) | 92/104 |

OTHER PUBLICATIONS

Patent Abstracts of Japan vol. 1998, No. 03, (Feb. 27, 1998) and JP 09 286659, Applicant NGK Spark Plug Co Ltd, Nov. 4, 1997.

* cited by examiner

*Primary Examiner*—John E. Ryznic
(74) *Attorney, Agent, or Firm*—Jacobson Holman, PLLC

(57) ABSTRACT

In a diaphragm pump with a hydraulically driven diaphragm which runs in a wavy manner in the radial direction, the arrangement is such that the wavelength and/or the amplitude of the wavy formation of the diaphragm is made variable in the radial direction.

17 Claims, 3 Drawing Sheets

DIAPHRAGM PUMP WITH A HYDRAULICALLY DRIVEN DIAPHRAGM

Figure 1:
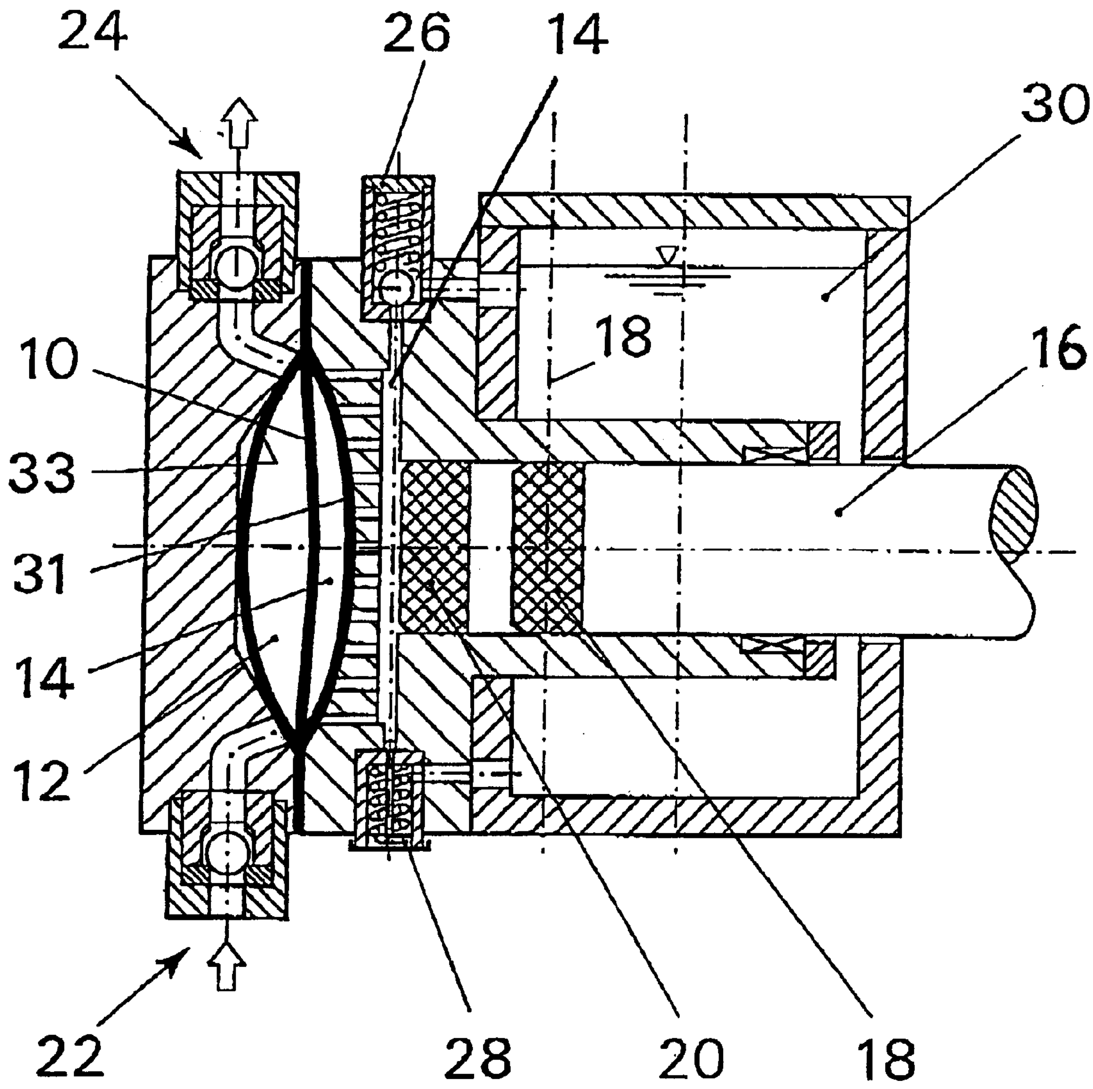

The invention relates to a diaphragm pump with a hydraulically driven diaphragm according to the preamble of claim 1.

In future, it will be possible for growing environmental protection requirements, together with strict legal conditions, to be satisfied usually only by means of hermetically sealed process installations. Leak-free fluid working machines, such as, for example, pumps and compressors, are of great importance in this context. Diaphragm pumps are an optimum solution, in particular, for the conveyance of toxic, hazardous, irritating, sensitive, abrasive, corrosive fluids and also for aseptic conditions. The diaphragm, as the central element, performs a double function as a static seal and a displacer in the form of an elastic conveying space wall. The static diaphragm seal is the basis for the hermetic leaktightness of diaphragm pumps. Furthermore, the diaphragm transmits the oscillating stroke movement of a drive to the fluid to be conveyed, thus giving rise not only to pulsating conveyance, but also to interaction with the fluid masses in the pipeline system. In the case of diaphragm pumps with a hydraulic diaphragm drive, the oscillating movement of a drive member is transmitted to the diaphragm via a hydraulic reservoir which comprises a hydraulic fluid. The hydraulically driven diaphragm always operates with pressure equalization and has to undergo only deflection stresses.

Diaphragms for hydraulic diaphragm pumps are to be as deformable as possible, in order to enclose as much volume as possible between the limits of positive and negative deformation. In this case, however, local bulging of the diaphragm may occur in an undesirable way. This results in locally high alternating bending stresses which lead relatively quickly to material fatigue.

The object on which the invention is based is to improve a diaphragm pump with a hydraulically driven diaphragm of the abovementioned type, in such a way that two concurrent conditions for the diaphragm are satisfied, specifically, on the one hand, the highest possible deformability which makes it possible to cover the largest possible volume during the working movement, and, on the other hand, a minimal tendency to local bulging actions during the movement.

This object is achieved, according to the invention, by means of a diaphragm pump of the above-mentioned type, having the features characterized in claim 1. Advantageous refinements of these are described in the further claims.

In a preferred embodiment, the waves are formed concentrically around the center point of the diaphragm. This results in a rotationally symmetric stress load on the diaphragm during operation.

There is provision, according to the invention, for the wavelength and/or the amplitude of the wavy formation of the diaphragm to be made variable in the radial direction.

The advantage of this is that, whilst the diaphragm has sufficient deformability for operating with a large stroke, sufficient rigidity against the formation of local bulges is ensured at the same time. The operating reliability and useful life of the diaphragm pump are increased thereby.

Expediently, starting from the center point of the diaphragm in the radially outward direction, the wavelength and/or the amplitude increases or first increases, reaches a maximum and then falls (decreases) again.

Supporting surfaces delimiting a working space of the diaphragm are provided for the appropriate support of the diaphragm, at least the supporting surface located on the hydraulic side having a bearing contour for the diaphragm in the deflected position of the latter, said bearing contour corresponding essentially to the wavy formation of the diaphragm. As a result, the diaphragm bears on the supporting surfaces not only with its wave crests, but over a large part of the contour. This appreciably improves the support, so that the diaphragm, without being damaged, can be pressed with pressure, for example, against the supporting surface or bearing support located on the hydraulics side.

The diaphragm is produced, for example, from an at least partially plastomeric or elastic material, in particular PTFE or PE.

In a preferred embodiment, starting from the center point of the diaphragm, as from 30% of the outer radius, a wavelength of the wavy formation is 6% to 13% of the radius and an amplitude of the wavy formation is 2% to 6% of the radius.

The invention is explained in more detail below with reference to the drawing in which, in each case in section: FIG. 1 shows a diaphragm pump, FIG. 2 shows various embodiments of diaphragm forms according to the invention, and FIG. 3 shows a preferred embodiment of supporting surfaces for the diaphragm.

As is apparent from FIG. 1, the diaphragm pump illustrated comprises a diaphragm 10 which separates a conveying space 12 from a hydraulic space 14. A piston 16 is provided as hydraulic drive and, during operation, oscillates about a constant piston center position. The piston 16 is illustrated by way of example in the piston center position 18 and in the front dead center position 20. The oscillating movement of the piston 16 is transmitted, via a hydraulic fluid in the hydraulic space 14, to the diaphragm 10 which executes a corresponding oscillating movement about the center position. In this way, fluid is sucked up from a suction side 22 of the diaphragm pump and is discharged again on a conveying side 24. The hydraulic space 14 is connected to a hydraulic supply space 30 via a pressure-limiting relief valve 26 and a refill valve 28 designed as a snifting valve. Supporting surfaces 31, 33 are also provided, which laterally delimit a working space of the diaphragm 10. In this case, 31 designates the supporting surface located on the hydraulics side and 33 the supporting surface located on the conveying space side.

Figure 2:
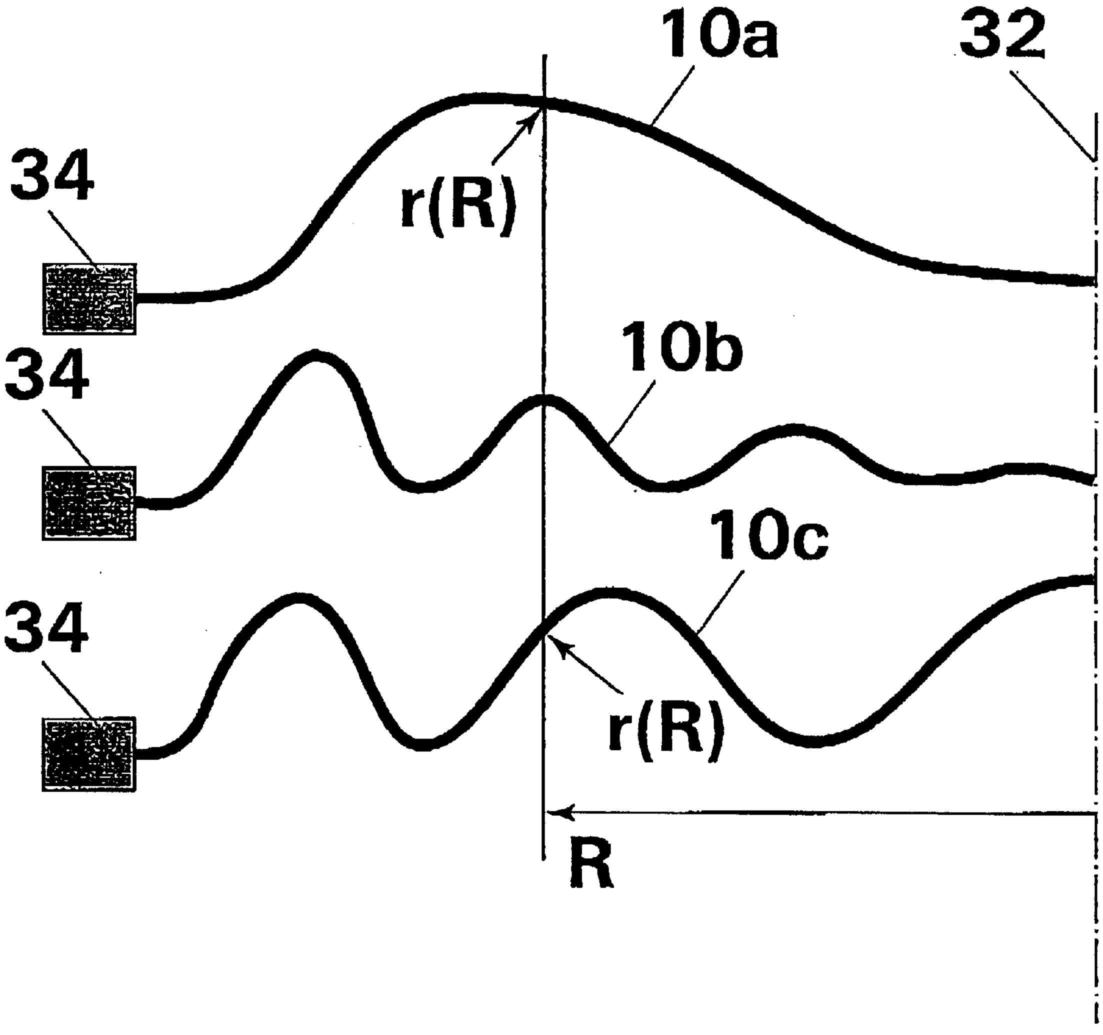
Figure 3:
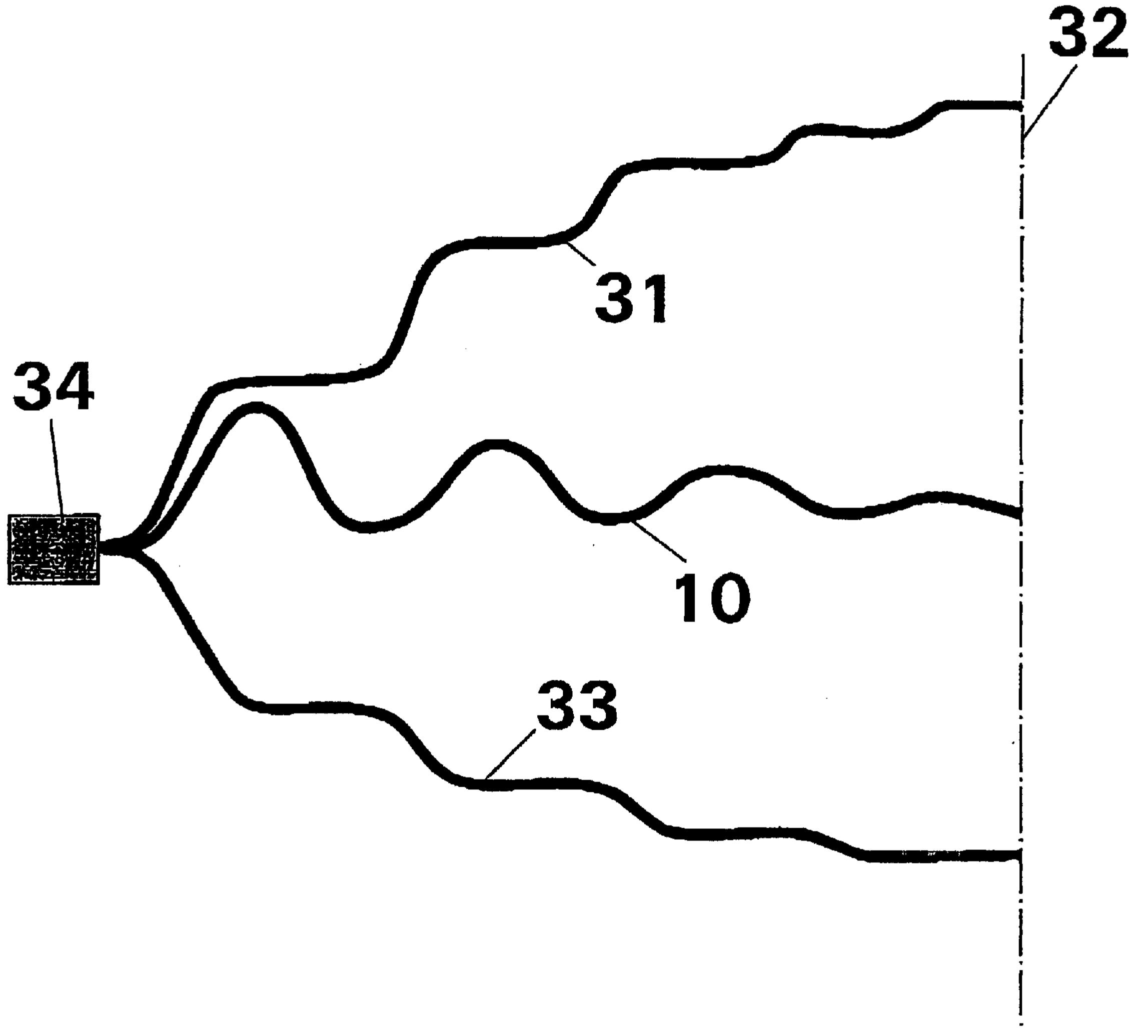

In the various diaphragm embodiments 10*a,* 10*b,* 10*c* apparent from FIG. 2, the design is such that, at a specific distance R starting from the center point 32 of the diaphragm, the wavy formation of the respective diaphragm 10*a,* 10*b,* 10*c* has, in radial section, a radius of curvature r. At the same time, starting from the center point 32 to a mounting point 34 of the diaphragm 10*a,* 10*b,* 10*c,* the curvature of the respective waves increases constantly.

In the diaphragm 10*b,* the height of the waves increases in radial section, that is to say the amplitude likewise increases with an increasing distance R from the center point.

In the diaphragm 10*c,* the wavelength decreases with an increasing distance R from the center point.

In a further embodiment, not illustrated, of the diaphragm 10, the amplitude increases with R (in accordance with the diaphragm 10*b*), whilst at the same time the wavelength decreases with an increasing R (in accordance with the diaphragm 10*c*).

FIG. 3 shows a preferred formation of the supporting surfaces 31 and 33 which delimit the working space of the diaphragm 10. Here, the diaphragm 10 is formed in a similar way to the diaphragm 10*b* according to FIG. 2. The supporting surfaces 31, 33 have a contour similar to the wave-like formation of the diaphragm 10, so that, in the fully deflected positions, the diaphragm 10 bears on the supporting surfaces 31, 33 not only with its wave crests, but also with a substantial part of its surface. In this way, the diaphragm 10 can be pressed onto the supporting surfaces 31, 33 even with high pressures, without at the same time being damaged.

By virtue of the above-described formation of the diaphragm 10, bulging can be avoided by means of a particular minimum spatial curvature (stiffening by shell molds) of the geometry which is at risk. The following applies to the spatial curvature KR:

$$KR=f\,(R;r)$$

in which R=the distance from the diaphragm center point 32 (that is to say, as it were, a position coordinate) and r=the local radius of curvature in radial profile section.

Curvatures which are too large restrict deformability and, if the same deformation occurs, also lead to an increase in the risk of "form-induced" fatigue. The diaphragm form described therefore has form elements which lie between fatigue due to local bulging and form-induced fatigue.

In order to avoid local bulging over the entire diaphragm surface and, on the other hand, extend maximum deformability as far as possible, according to the invention the increasing decrease in curvature with increasing distance R from the diaphragm centerpoint 32 is compensated by an increase in the local curvature r (R) in radial section.

Geometric elements which differ from the conventional planar or spherical boundary surfaces of the diaphragm working space 12, 14 are thus obtained for the diaphragm 10. This is taken into account by the supporting surfaces 31, 33 according to FIG. 3 which are formed according to the invention and have a contour corresponding to the diaphragm 10.

The expression "waves" which is used here refers essentially only to those shaped-out portions which make a clearly measurable contribution to the deformation of the diaphragm 10 and consequently to its displacement volume.

What is claimed is:

1. Diaphragm pump with a hydraulic driven diaphragm, the diaphragm being formed in a wavy manner in a radial direction, and starting from a center point of the diaphragm in a radially outward direction, a radius of curvature of the wavy manner decreases.

2. Diaphragm pump according to claim 1, wherein starting from the center point of the diaphragm in the radially outward direction, the wavelength is constant and the amplitude increases.

3. Diaphragm pump according to claim 1, wherein starting from the center point of the diaphragm in the radially outward direction, the wavelength decreases and the amplitude is constant.

4. Diaphragm pump according to claim 1, wherein starting from the center point of the diaphragm in the radially outward direction, the wavelength decreases and the amplitude increases.

5. Diaphragm pump according to claim 1, wherein waves are formed concentrically around the center point of the diaphragm.

6. Diaphragm pump according to claim 1, wherein supporting surfaces delimiting a working space of the diaphragm are provided, at least the supporting surface located on a hydraulics side having a bearing contour for the diaphragm; in a deflected position of the latter, said bearing contour corresponding essentially to the wavy formation of the deflected diaphragm.

7. Diaphragm pump according to claim 1, wherein the diaphragm is produced from an at least partially plastomeric or elastic material.

8. Diaphragm pump according to claim 1, wherein starting from the center point of the diaphragm, as from 30% of the outer radius, a wavelength of the wavy formation is 6% to 13% of the radius.

9. Diaphragm pump according to claim 1, wherein, starting from the center point of the diaphragm, as from 30% of the outer radius, an amplitude of the wavy formation is 2% to 6% of the radius.

10. Diaphragm pump with a hydraulically driven diaphragm, the diaphragm being formed in a wavy manner in a radial direction, at least one of a wavelength and an amplitude of the wavy formation of the diaphragm is made variable in the radial direction, and starting from a center point of the diaphragm, as from 30% of the outer radius, a wavelength of the wavy formation is 6% to 13% of the radius.

11. Diaphragm pump according to claim 10, wherein starting from the center point of the diaphragm in the radially outward direction, the wavelength increases or decreases.

12. Diaphragm pump according to claim 10, wherein starting from the center point of the diaphragm in the radially outward direction, the amplitude increases or decreases.

13. Diaphragm pump according to claim 10, wherein waves are formed concentrically around the center point of the diaphragm.

14. Diaphragm pump according to claim 10, wherein supporting surfaces delimiting a working space of the diaphragm) are provided, at least the supporting surface located on a hydraulics side having a bearing contour for the diaphragm in a deflected position of the latter, said bearing contour corresponding essentially to the wavy formation of the deflected diaphragm.

15. Diaphragm pump according to claim 10, wherein the diaphragm is produced from an at least partially plastomeric or elastic material.

16. Diaphragm pump according to claim 10, wherein starting from the center point of the diaphragm, as from 30% of the outer radius, an amplitude of the wavy formation is 2% to 6% of the radius.

17. Diaphragm pump according to claim 10, wherein starting from the center point of the diaphragm in the radially outward direction, the wavelength decreases and the amplitude decreases.

* * * * *